(12) United States Patent
Paternoster et al.

(10) Patent No.: US 11,597,141 B2
(45) Date of Patent: Mar. 7, 2023

(54) METHOD AND DEVICE FOR PRODUCING A THREE-DIMENSIONAL OBJECT

(71) Applicant: EOS GmbH Electro Optical Systems, Krailling (DE)

(72) Inventors: Stefan Paternoster, Andechs (DE); Stefan Grünberger, Munich (DE)

(73) Assignee: EOS GmbH Electro Optical Systems, Krailling (DE)

(*) Notice: Subject to any disclaimer, the term of this patent is extended or adjusted under 35 U.S.C. 154(b) by 0 days.

(21) Appl. No.: 15/742,938

(22) PCT Filed: Jul. 6, 2016

(86) PCT No.: PCT/EP2016/001153
§ 371 (c)(1),
(2) Date: Jan. 9, 2018

(87) PCT Pub. No.: WO2017/008891
PCT Pub. Date: Jan. 19, 2017

(65) Prior Publication Data
US 2018/0370127 A1 Dec. 27, 2018

(30) Foreign Application Priority Data
Jul. 13, 2015 (DE) .......................... 102015213103.3

(51) Int. Cl.
*B29C 64/153* (2017.01)
*B33Y 10/00* (2015.01)
(Continued)

(52) U.S. Cl.
CPC ............ *B29C 64/153* (2017.08); *B22F 10/20* (2021.01); *B28B 1/001* (2013.01);
(Continued)

(58) Field of Classification Search
CPC .......................... B29C 64/153; B29C 64/214
(Continued)

(56) References Cited

U.S. PATENT DOCUMENTS

| 6,136,257 A * | 10/2000 | Graf | B29C 64/153 |
| | | | 118/308 |
| 6,596,224 B1 * | 7/2003 | Sachs | B33Y 10/00 |
| | | | 425/84 |

(Continued)

FOREIGN PATENT DOCUMENTS

| DE | 10342880 | 4/2005 |
| DE | 102005022308 | 11/2006 |

(Continued)

OTHER PUBLICATIONS

Yang et al., Metering and dispensing of powder; the quest for new solid freeforming techniques, Powder Technology, 178(1), 2007, Elsevier, pp. 56-72 (English) (3 pages).

*Primary Examiner* — Matthew J Daniels
*Assistant Examiner* — Wayne K. Swier
(74) *Attorney, Agent, or Firm* — Seyfarth Shaw LLP

(57) ABSTRACT

A method for producing a three-dimensional object on a support by applying layer by layer and selectively solidifying a building material in powder form. The method includes lowering the support to a predetermined height below a working plane, applying a layer of the building material in powder form in the working plane, selectively solidifying the applied powder layer at positions corresponding to a cross-section of the object to be produced and repeating the steps of lowering, applying and selectively solidifying until the object is completed. By doing so, the quantity of applied building material in powder form is reduced in a section in (Continued)

an actively controlled way or substantially no building material in powder form is applied in a section in an actively controlled way.

17 Claims, 3 Drawing Sheets

(51) Int. Cl.
*B33Y 30/00* (2015.01)
*B33Y 50/02* (2015.01)
*B29C 64/214* (2017.01)
*B29C 64/245* (2017.01)
*B29C 64/295* (2017.01)
*B29C 64/343* (2017.01)
*B29C 64/393* (2017.01)
*B22F 3/105* (2006.01)
*B28B 1/00* (2006.01)
*B28B 17/00* (2006.01)
*B22F 10/20* (2021.01)
*B22F 10/30* (2021.01)

(52) U.S. Cl.
CPC ........ *B28B 17/0081* (2013.01); *B29C 64/214* (2017.08); *B29C 64/245* (2017.08); *B29C 64/295* (2017.08); *B29C 64/343* (2017.08); *B29C 64/393* (2017.08); *B33Y 10/00* (2014.12); *B33Y 30/00* (2014.12); *B33Y 50/02* (2014.12); *B22F 10/30* (2021.01)

(58) Field of Classification Search
USPC ......................................................... 427/532
See application file for complete search history.

(56) References Cited

U.S. PATENT DOCUMENTS

| | | | |
|---|---|---|---|
| 7,435,368 B2 * | 10/2008 | Davidson | B33Y 10/00 425/130 |
| 2007/0023977 A1 * | 2/2007 | Braun | B29C 64/153 264/497 |
| 2008/0001331 A1 | 1/2008 | Ederer | |
| 2008/0260945 A1 | 10/2008 | Ederer et al. | |
| 2009/0020522 A1 | 1/2009 | Zoulkarneev et al. | |
| 2009/0045553 A1 * | 2/2009 | Weidinger | B33Y 30/00 264/497 |
| 2009/0068376 A1 * | 3/2009 | Philippi | B29C 64/153 427/532 |
| 2009/0176007 A1 | 7/2009 | Uckelmann | |
| 2011/0223349 A1 * | 9/2011 | Scott | B22F 3/1055 427/532 |
| 2011/0278773 A1 * | 11/2011 | Bokodi | B22F 12/222 425/150 |
| 2012/0094026 A1 * | 4/2012 | Ederer | B29C 64/153 427/356 |
| 2013/0108726 A1 * | 5/2013 | Uckelmann | B29C 64/176 425/375 |
| 2014/0252685 A1 | 9/2014 | Stacker et al. | |
| 2014/0255666 A1 | 9/2014 | Stacker et al. | |
| 2014/0363585 A1 * | 12/2014 | Pialot | B29C 64/218 427/551 |
| 2015/0139849 A1 * | 5/2015 | Pialot, Jr. | B22F 3/1055 419/55 |
| 2018/0071987 A1 * | 3/2018 | Tsumuraya | B22F 10/38 |

FOREIGN PATENT DOCUMENTS

| | | |
|---|---|---|
| DE | 102005050665 | 4/2007 |
| DE | 102010020418 | 11/2011 |
| DE | 102015207158 | 10/2016 |
| EP | 1872928 | 1/2008 |
| EP | 2202016 | 11/2008 |
| JP | 2010509092 | 3/2010 |
| WO | 2014138386 | 9/2014 |

* cited by examiner

METHOD AND DEVICE FOR PRODUCING A THREE-DIMENSIONAL OBJECT

TITLE

Technical Field of the Invention

The present invention relates to a method and a device for producing a three-dimensional object by applying and selectively solidifying, layer by layer, a building material in powder form.

Background of the Invention

Methods and devices of that type are used, for example, in rapid prototyping, rapid tooling or additive manufacturing. An example of such a method is known as "selective laser sintering or laser melting". In said method, a thin layer of a building material in powder form is applied repeatedly, and the building material in each layer is selectively solidified by selective irradiation with a laser beam.

EP 1 872 928 A1 describes a method in which the application of the layers takes place by dispensing particle material from a metering device that moves over a build area. For this purpose, the metering device comprises a long dispensing gap that is open to the bottom and extends perpendicular to the metering device. The metering device can be switched on and off in a controlled manner during its movement. To apply a new layer, the metering device is further raised by the desired layer thickness. In a preferred embodiment the metering device is switched on when its dispensing gap is above the front edge of the next lower layer and is switched off when its dispensing gap is above the rear edge of the next lower layer.

In general, however, not the application unit is raised from layer to layer for applying the powder, but a support on which the object is produced is lowered from layer to layer. The maximum size of the build area in which the object to be produced can be built is determined by the area which can be lowered by height adjustment of the support.

Such a device is described, for example, in DE 10 2010 020 418 A1. In addition, it is described therein that the application of the material can be limited to a smaller area than to the maximum build area. In doing so, a restriction of the application area in the direction of movement of the application device is achieved by shortening the length of the path of movement of the application device, i.e. that the application device reverses its direction of movement before the end of the build area. A restriction perpendicular to the direction of movement is provided by a mechanical insert in the application device.

In the German patent application No. 10 2015 207 158, which has not yet been published at the time of filing of the present application, a method is described in which the height of an applied powder layer increases or decreases in the direction of movement of the application device at least in a section. This is achieved by changing the height distance between the application device and a previously applied layer, for example by lowering the application device and/or lifting and/or tilting the support on which the object is produced.

SUMMARY OF THE INVENTION

It is the object of the present invention to provide an improved method and an improved device for producing a three-dimensional object by applying layer by layer and selectively solidifying a building material in powder form.

The object is achieved by a method according to claim 1, a computer program according to claim 12, a control unit according to claim 13 or a device according to claim 14. Further developments of the invention are given in the respective dependent claims. The method and/or the computer program can also be further developed by the features of the control unit and/or the device, which features are given below or in the dependent claims, or vice versa.

The method according to the invention for producing a three-dimensional object on a support by layer-wise applying and selectively solidifying a building material in powder form comprises the steps of: lowering the support to a predetermined height below a working plane, applying a layer of the building material in powder form in the working plane by means of an application device moving over the working plane, selectively solidifying the applied powder layer at positions that correspond to a cross-section of the object to be produced and repeating the steps of lowering, applying and selectively solidifying until the object is completed. In said method, within an intended application area located in the working plane, with respect to at least one powder layer, within an area across which the application device actually moves, the quantity of applied building material in powder form is reduced (for example step-wise or steplessly, or continuously or discontinuously reduced) in a section in an actively controlled way or no building material in powder form is applied in a section in an actively controlled way. By doing so, the area in which building material in powder form is applied can be limited or a plurality of mutually separated areas in which building material in powder form is applied can be provided.

The intended application area preferably comprises a build area and a boundary area surrounding the latter, the build area being the lowerable area within which the applied and selectively solidified powder layers are lowered before applying a new powder layer and wherein, with respect to at least one powder layer, the application of the building material in powder form is actively controlled in such a way that in the boundary area at least in a section less building material in powder form is applied than in the build area or no building material in powder form at all is applied, wherein the application of the building material in powder form is preferably controlled in such a way that the building material in powder form is applied all over the entire build area. By doing so, it is possible, among other things, to limit the application of the powder to the region for which this is necessary and the disadvantages of spreading clumped powder from the boundary area to the build area can be avoided.

Preferably, the actively controlled application of the building material in powder form takes place with respect to a plurality, particularly preferred the total number of powder layers. By doing so, the advantages of the invention can be achieved for a plurality or the total number of powder layers.

Preferably, the building material in powder form is metered in the direction of the application device from a metering device moving along with the application device and is then applied by the application device. This eliminates for example the need for a separate metering device in the application device itself and the powder supply in the application device can be kept approximately constant, which homogenizes the application conditions.

Preferably, the building material in powder form is fluidized and/or preheated in the application device and/or the metering device before it is applied to the working plane.

This facilitates the application of the powder, improves the layer quality or shortens the processing time.

Preferably, a metering of the building material in powder form is controlled via a closure in the application device and/or the metering device, wherein the closure is preferably opened and/or closed in a stepless manner and/or wherein the closure comprises a slider and/or a milled or slotted shaft. Thus, the quantity of powder applied can be metered by simple means.

Preferably, a working plate is arranged around the build area in the working plane, which working plate is preferably heated by a separate heating element, the temperature of the working plate being in particular controlled in such a way that it is higher than a temperature within the build area. The term "temperature within the build area" denotes, in particular, the (average) temperature at those positions in the build area where a local temperature peak, induced by selectively solidifying (such as a solidification laser beam), is not present at the moment.

As an alternative to this, a working table is preferably arranged around the build area, which is at least partially located below the working plane and which is preferably heated by a separate heating element, the temperature of the working table being in particular controlled in such a way that it is higher than a temperature within the build area. Here, too, the above definition of "temperature within the build area" applies in particular. By heating the working plate or the working table, disturbances of the temperature distribution in the build area, caused by convective circulation, can be avoided and the quality of the object can thus be improved. By arranging the working table below the working plane, it is possible, for example, to prevent powder that may get onto the working table and may clump due to heating from getting back onto the build area, which can also improve the quality of the object.

Preferably, an overflow slit is arranged behind the build area in the application direction (preferably substantially adjacent to the build area) through which surplus powder can fall into an overflow container. This, in addition, prevents excess powder from reaching the boundary area of the intended application area.

The computer program according to the invention, which can be loaded into a programmable control unit, comprises program code means for executing all steps of the method according to the invention when the computer program is executed on the control unit. This makes it possible to implement the method according to the invention in a simple manner by software control by executing the computer program on a control unit.

The control unit according to the invention is meant for a device for producing a three-dimensional object by selectively solidifying a building material layer by layer, wherein the device comprises: a support that can be moved in a vertical direction and on which the object is to be produced, an application device that can be moved over a working plane for applying a layer of the building material to the working plane and a solidification device for selectively solidifying the applied layer at positions that correspond to a cross-section of the object to be produced. The control unit is configured to control the device such that it repeats the steps of lowering, applying and selectively solidifying until the object is completed and that it carries out the application of the building material in powder form in such a way that within an intended application area located in the working plane, with respect to at least one powder layer, within an area across which the application device actually moves, the quantity of applied building material in powder form is reduced in a section in an actively controlled way or no building material in powder form is applied in a section in an actively controlled way. This makes it possible to implement the method according to the invention by means of a control unit.

According to the invention, the device for producing a three-dimensional object by selectively solidifying a building material layer by layer comprises: a support that can be moved in a vertical direction and on which the object is to be produced, an application device that can be moved over a working plane for applying a layer of the building material to the working plane and a solidification device for selectively solidifying the applied layer at positions that correspond to a cross-section of the object to be produced. The device is configured and/or controlled to repeat the steps of lowering, applying and selectively solidifying until the object is completed and to carry out the application of the building material in powder form in such a way that within an intended application area located in the working plane, with respect to at least one powder layer, within an area across which the application device actually moves, the quantity of applied building material in powder form is reduced in a section in an actively controlled way or no building material in powder form is applied in a section in an actively controlled way. Thus, a device for producing a three-dimensional object is provided, which device is capable of executing the method according to the invention.

Preferably, the device further comprises a container open to its top, the support being arranged in the container, the upper opening of the container being located in the working plane, the inside of said opening forming a build area that can be lowered step by step and the device being configured and/or controlled to carry out the application of the building material in powder form with respect to at least one powder layer in an actively controlled way such that in a boundary area of the intended application area, which boundary area surrounds the build area, at least in some regions less building material in powder form is applied than in the build area or no building material in powder form at all is applied. Thus, among other things, the application of the powder can be limited to the region for which this is necessary and the disadvantages of spreading clumped powder from the boundary area to the build area can be avoided.

BRIEF DESCRIPTION OF THE DRAWINGS

Further features and expediencies of the invention are set out in the description of exemplary embodiments with the aid of the attached drawings.

DETAILED DESCRIPTION OF THE EMBODIMENTS

Figure 1:
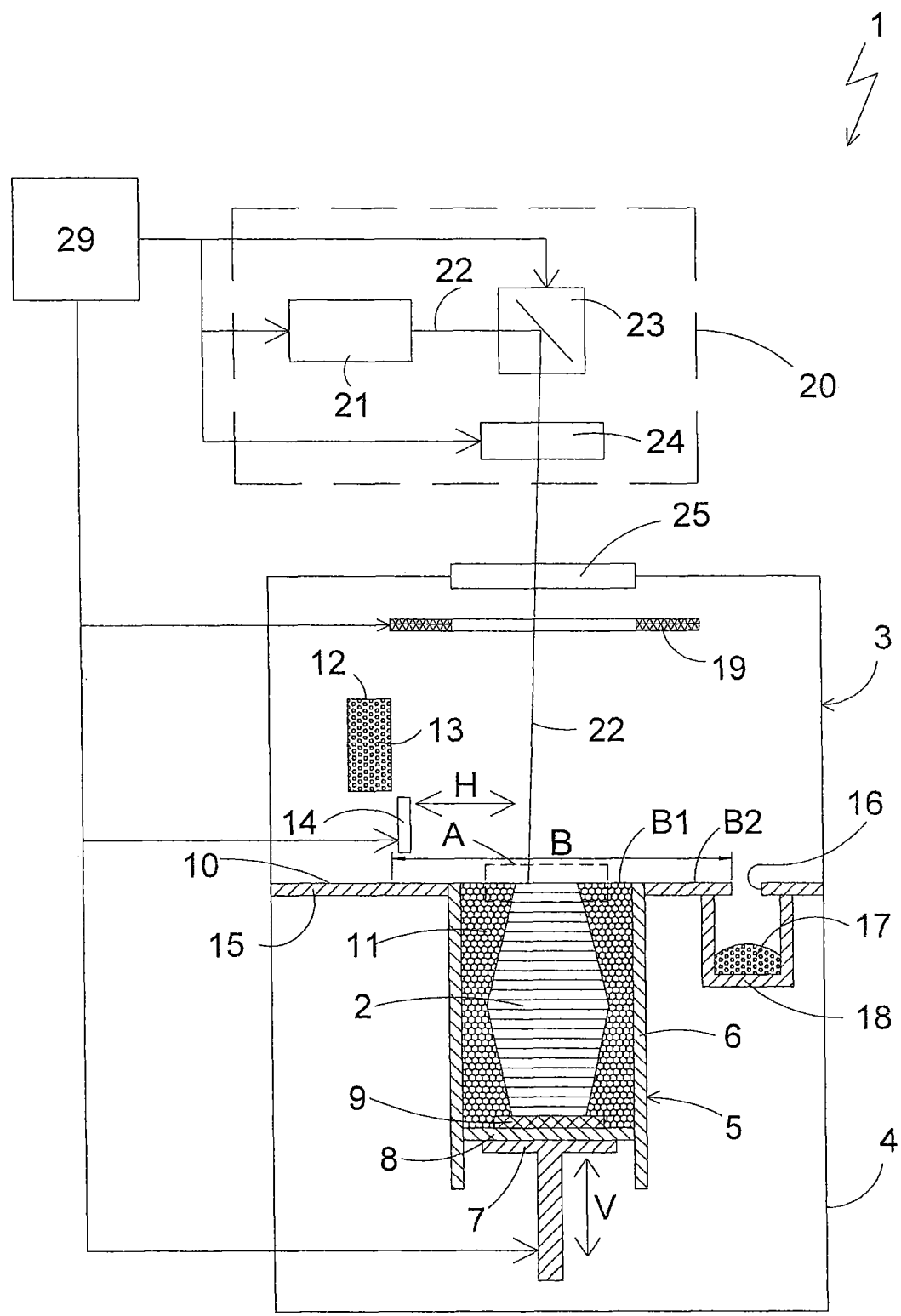
FIG. 1 shows a schematic view, partially in cross-section, of a device for producing a three-dimensional object layer by layer, which device is configured to implement a method according to a first exemplary embodiment of the present invention.

Hereafter, an exemplary embodiment of a device 1 is described with reference to FIG. 1, which device 1 is configured to implement a method according to a first exemplary embodiment of the invention. The device shown in FIG. 1 is a laser sintering or laser melting device 1. For building an object 2, it comprises a processing chamber 3 with a chamber wall 4.

A container 5 open to the top with a container wall 6 is arranged in the processing chamber 3. In the container 5 a support 7 is arranged that can be moved in a vertical direction V and to which a base plate 8 is attached which seals the container 5 to the bottom and thus forms the bottom thereof. The base plate 8 can be formed as a plate separately from the support 7 which plate is fixed to the support 7, or it can be integrally formed with the support 7. Depending on the powder and process used, a building platform 9 can also be arranged on the base plate 8 on which the object 2 is built. However, the object 2 can also be built on the base plate 8 itself, which then serves as a building platform. In FIG. 1, the object 2 to be formed in the container 5 on the building platform 9 is shown below a working plane 10 defined by the upper edge of the wall 6 in an intermediate state with several solidified layers, surrounded by building material 11 that remained unsolidified.

The laser sintering device 1 further comprises a storage container 12 for a building material 13 in powder form which can be solidified by electromagnetic radiation and an application device 14 which can be moved in a horizontal direction H for an application of the building material 13 to the working plane 10. A working plate 15 which surrounds the container 5 on all sides and which is preferably thermally insulated from the container is arranged in such a way that its upper surface is located in the working plane 10. An overflow slit 16 is arranged in the working plate 15 at the side opposite the storage container 12 through which overflow slit surplus powder 17 can fall into an overflow container 18. Furthermore, a radiant heater 19 is arranged in the processing chamber for heating the building material 13 applied in the working plane 10.

The laser sintering device 1 further comprises an exposure device 20 with a laser 21 which produces a laser beam 22 which is deflected by a deflection device 23 and focused upon the working plane 10 by way of a focusing device 24 through a coupling window 25 which is arranged on the upper side of the wall 4.

Furthermore, the laser sintering device 1 comprises a control unit 29 by which the individual components of the device 1 can be controlled in a coordinated manner in order to implement the building process. The control unit can comprise a CPU, the operation of which is controlled by a computer program (software). The computer program can be stored separately from the device on a storage medium from which it can be loaded into the device, in particular into the control unit.

In operation, in order to apply a powder layer, the support 7 is first lowered by an amount which corresponds to the desired layer thickness. Then a layer of the building material in powder form 13 is applied by moving the application device 14 over the working plane 10. An intended application area B is defined as the area of the working plane 10 within which the application device 14 is able to apply powder during its intended use, i.e. in which area its coating function (i.e. function of application) is possible. In the laser sintering device 1 shown in FIG. 1, the intended application area B extends from the point at which the application device 14 receives building material in powder form from the storage container 12 to the overflow slit 16 through which the surplus powder 17 that still remains in the application device 14 there falls into the overflow container 18. Behind it, no coating function is possible.

The intended application area B comprises the build area B1, that is to say that area of the working plane 10 which is located within the upper opening of the container 5, and a boundary area B2 surrounding the build area B1. The build area B1 is the area in which the object 2 can be produced and in which the applied and selectively solidified powder layers are lowered before the application of a new powder layer.

The applied layer of building material is preheated by the radiant heater 19 that is configured to heat the entire build area B1. A part of the working plate 15 is heated by the radiant heater 19, too. However, the working plate 15 can also be heated by a separate heating element (not shown in the figure) attached to it.

The cross-section of the object 2 to be produced is then scanned by the laser beam 22 so that the building material in powder form 13 is solidified at these positions corresponding to the cross-section of the object 2 to be produced. These steps are repeated until the object 2 is completed and can be removed from the building space.

Figure 2:
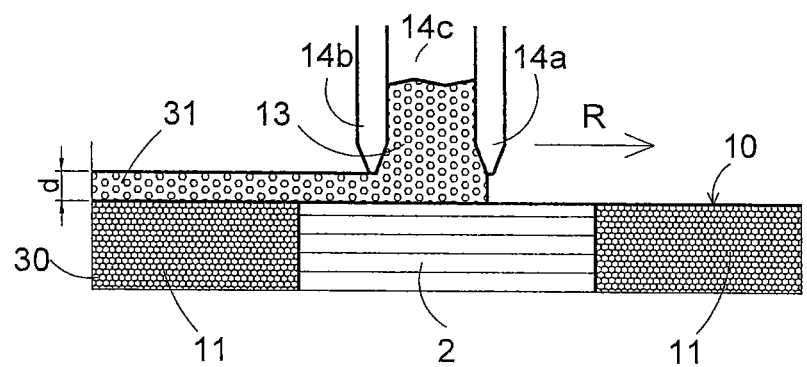
FIG. 2 shows an enlarged schematic cross-sectional view of a portion that is framed by a dashed line in FIG. 1 during application of a powder layer.

FIG. 2 schematically shows an enlarged section A framed by a dashed line in FIG. 1.

After the application and solidification of a powder layer 30 the solidified part of the object 2 to be produced located within said layer is surrounded by non-solidified powder 11. A further powder layer 31 of the building material 13 is then applied onto this previously applied and selectively solidified powder layer 30 by means of a movement of the application device 14 in an application direction (coating direction) R.

As shown in FIG. 2, the application device 14 comprises an application unit with a blade that is located ahead with respect to the application direction R (front blade 14a) and a blade that is located to the back with respect to the application direction R (rear blade 14b). These two blades at least partially enclose an intermediate space 14c in the application direction B and in the opposite direction to the application direction. This intermediate space 14c delimited by the two blades 14a, 14b is configured to receive a supply of building material in powder form 13. Perpendicular to the plane of the figure, the two blades 14a, 14b and thus also the intermediate space 14c delimited by them extend over the entire width of the area to which the powder is to be applied.

Upon moving the application device 14 in the application direction B, part of said building material in powder form 13 remains on the previous layer 30 and is spread in a uniform thin powder layer 31 of thickness d by the rear blade 14b. The amount of powder that is applied is determined by the height distance between the lower edge of the rear blade 14b and the previously applied layer 30.

In order to apply the new powder layer 31, the application unit 14a-c of the application device 14 first moves to the storage container 12 and receives there a predetermined amount of the building material 13 in powder form. This predetermined amount of powder is preferably larger than the amount of powder needed to apply a layer of the building material in powder form 13. Then, the application unit 14a-c moves over the working plane 10 and applies the new powder layer 31. When the application unit 14a-c reaches the overflow slit 16, the surplus powder 17 still remaining there in the application device 14 falls into the overflow container 18.

According to the present embodiment, the new powder layer 31 is applied such that, in an sub-area within the intended application area, which sub-area the application device 14 actually moves across, at least in some regions the quantity of applied building material in powder form 13 is reduced in an actively controlled way or no building material in powder form 13 at all is applied.

Within this context, actively controlled is understood to mean that the quantity of the applied building material in powder form is not determined by the height distance between the lower edge of the rear blade 14b and the previously applied layer 30, but is actively reduced selectively and depending on the position with respect to the quantity possible due to this height distance. This actively controlled reduction of the quantity of powder is implemented for at least one powder layer, preferably for a plurality of powder layers, more preferably for all powder layers.

Such an active control is implemented, for example, by purposefully controlling the quantity of building material in powder form 14 supplied by the application device 14 by means of a device attached to the application device. This device can, for example, be a closure and/or a metering device which is attached to the application device. The closure can preferably be opened and/or closed in a stepless manner. It can, for example, be formed by a slide or by a milled or slotted shaft which releases or blocks the delivery of powder via a sealing surface with a gap by means of a rotating movement.

As a result, the amount of powder applied can be controlled locally differentiated in the direction of movement of the application device as well as in the transverse direction of the application device. In contrast to the prior art described above, it is thus possible, for example, to provide more than one reduced building region within the maximum possible build area. However, the building material in powder form can also be applied in such a way that powder is applied to the entire build area B1, wherein the building material in powder form is preferably applied all over the build area and wherein at least in some regions less building material in powder form than in the build area or substantially no building material in powder form is applied in the boundary area B2 of the intended application area.

The last alternative is particularly advantageous when heating the working plate 15 by means of a heating element specially attached thereto. This is done for example in order to reduce undesired convections in the processing chamber due to a horizontal temperature gradient between the powder layer in the build area B1 heated by the radiant heater 19 and the working plate 15, which is thermally slower and better dissipates heat.

If, however, the temperature of the working plate 15 becomes too high, the building material in powder form 13 that is applied to the working plate may clot and be pulled to the build area 15 during the backward movement of the application device 14, as a result of which the quality of the object produced can also be impaired.

Against this background, it is preferred that the temperature of the working table is optimized taking into account a threshold value of the building material in powder form used, at which threshold value the building material in powder form tends to clot.

The risk of clumping is also reduced or even avoided if less or no building material in powder form is applied to the boundary area. On the other hand, the temperature of the working plate 15 can also be increased, which leads to a better temperature distribution in the build area. Both effects contribute to an improvement and homogenization of the quality of the object.

In order to avoid convective circulation, heating of the working plate 15 to the temperature of the build area would theoretically be sufficient. Due to thermal losses, such as thermal conduction or radiation to colder regions, it is, however, preferred to increase the temperature of the working plate 15 beyond the temperature of the build area.

Figure 3:
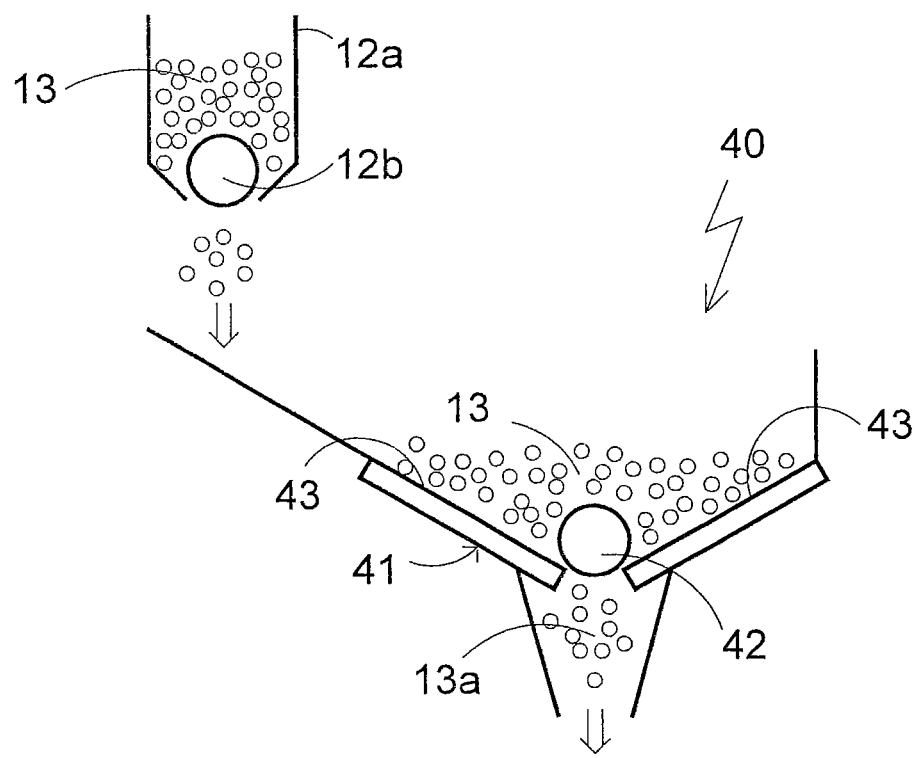
FIG. 3 shows a schematic cross-sectional view of a metering module used in a method according to a second embodiment of the present invention.

While the actively controlled metering of the quantity of powder according to the first embodiment takes place in the application device itself, according to a second embodiment, metering takes place alternatively or additionally in a separate metering module. FIG. 3 shows an enlarged schematic view in cross-section of a metering module used in the second embodiment. In the following only the differences from the first embodiment are described, the features of the device and the method which are not described are as given in the first embodiment.

The metering module 40 comprises a container 41 with a funnel-shaped cross-section in the present embodiment which is suited for receiving a predetermined quantity of building material in powder form 13, and a metering device 42 by means of which building material in powder form can be dispensed to the movable application device 14 (not shown in the figure).

In operation, the metering module 40 receives a predetermined quantity of building material in powder form 13 from a powder outlet 12a of the storage container 12 into the container 41 via the metering device 12b of the storage container. This predetermined quantity of powder is preferably larger than the amount of powder required for applying a layer of the building material in powder form 13.

Preferably, the powder 13 received in the container 41 is preheated by means of a local radiant heater (not shown) and/or is fluidized by introducing a preferably heated gas, i.e. a fluidized bed of the powder 13 is produced in the container 41. The metering module, together with the application device 14, moves over the working plane and, by doing so, dispenses, by means of the metering device 42, powder 13 to the application unit 14a-c described in the first embodiment, which application unit applies the powder layer 31. This dispensing of powder can be done continuously or at intervals.

According to the present embodiment, the building material in powder form 13 is dispensed from the metering module 40 to the application device 14 such that in a sub-region of the intended application area B, which sub-region the application device 14 actually moves across, the quantity of the applied building material in powder form 13 is reduced at least in a section in an actively controlled way or no building material in powder form 13 is applied at all at least in a section in an actively controlled way.

Thus, by this embodiment, the same effects can be obtained as with the first embodiment. In addition to that, by means of specifically re-dispensing powder from the metering module 40, the powder level in the application device 14 can be kept constant in the area in which the full application of powder takes place, so that constant application conditions are achieved, which further increases the object quality. Dispensing of powder is then reduced or completely blocked in time before reaching the areas in which less or no powder is to be applied.

The shape of the container of the metering module is not limited to the funnel shape described above, but can be any shape suitable for receiving and dispensing a limited quantity of powder.

Figure 4:
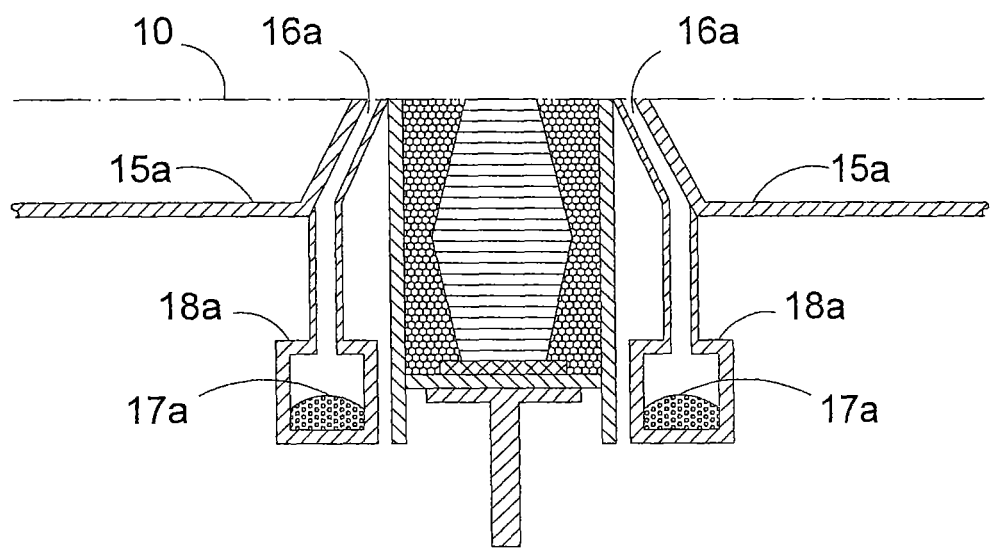
FIG. 4 shows a schematic partial view, partially in cross-section, of a device producing a three-dimensional object layer by layer according to a third embodiment of the present invention.

FIG. 4 shows a partial view of the device shown in FIG. 1 with a modification corresponding to a third embodiment of the present invention. In the following, only the differences from the first and second embodiment are described, features of the device and of the method which are not described are as given in the first or second embodiment.

The device according to the present embodiment differs from the device shown in FIG. 1 in that a working table 15a, which is at least partially located below the working plane 10, is provided instead of the working plate 15, the upper surface of which working plate being located in the working plane 10. Similar to the working plate 15, the working table 15a can be heated by means of a heating element (not shown in the figure) which is specifically attached to it. Here, too, the temperature of the working table 15a can be controlled so as to be higher than a temperature within the build area B1.

Furthermore, in this embodiment, one overflow slit 16a and one overflow container 18a are each arranged on the right and on the left of the build area B1. The application unit 14a-c shown in FIG. 2 is, due to its symmetrical structure, suitable for applying powder also in a direction opposite to the initial application direction R. For this purpose, a storage container (not shown in the figure) is also arranged on the right-hand side, which container corresponds to the storage container shown in FIG. 1 on the left-hand side. Upon moving the application device 14 from the right to the left, the powder located in the intermediate space 14c is then spread in a uniform thin powder layer by the blade 14a. Surplus powder falls through the left overflow slit into the left overflow container at the end of the application, while it falls through the right overflow slit into the right overflow container after moving the application device from the left to the right.

As shown in FIG. 4, the two overflow slits are preferably arranged directly adjacent to the container 5, i.e. directly adjacent to the build area B1, without a part of the working table 15a being located between the build area B1 and the overflow slit 16a. By actively controlled metering (i.e. dispensing) the quantity of powder applied it can be achieved that only a small portion of powder, which, for example, slips off from the edge of the applied powder layer, passes into the overflow slit. Ideally, the metering is so accurate that the surplus amount approaches zero.

The arrangement of the overflow slit directly adjacent to (i.e. in the respective coating direction directly behind) the build area, in conjunction with the actively controlled metering, causes hardly any (ideally no) powder to reach the possibly heated working table, while positioning the working table below the working plane causes no powder that possibly reaches the heated working table (and possibly clots there) to get back to the build area. By this, the effects of the first and second embodiments can further be improved.

The features of the embodiments described above can, if possible, also be combined with one another individually or in groups. For example, moving the application device back and forth and/or the arrangement of the overflow slits at both sides of the container and/or directly adjacent to the container as described for the third embodiment can also be realized in the first or second embodiment, fluidizing and/or preheating of the powder which takes place according to the second embodiment in the metering module 40 can also take place in the first embodiment in the application device 14, etc.

In the application module 14a-c shown in FIG. 2, the front blade 14a and the rear blade 14b each can also be formed by two adjacent blades. The blade which is the respective forerunning blade in application direction (i.e. located inside the symmetrical module) serves as an application blade that spreads the building material in powder form in a thin layer, while the respective blade trailing in application direction (i.e. located outside in the symmetrical module) serves as a compacting blade which further compacts the applied powder.

Where possible, only the front or rear blade 14a, 14b may be provided. At doing so, for example, a defined quantity of powder is applied in front of the blade in the application direction by the metering module 40 shown in FIG. 3 and said quantity of powder is moved forward by the blade and spread in a powder layer 31.

Even though the present invention was described with regard to a laser sintering device or a laser melting device, it is not restricted to laser sintering or laser melting. It can be applied to any method for producing a three-dimensional object by applying and selectively solidifying a building material in powder form layer by layer.

The laser may, for example, comprise a gas or solid state laser, a laser diode, or any other kind of laser. In general, any device can be used which is suited to selectively introduce energy onto a layer of the building material. Instead of a laser, for example a plurality of lasers, another light source, an electron beam or any other source of energy or of radiation suited to solidify the building material may be used. The invention may also be applied to selective mask sintering, wherein an extended light source and a mask are used, absorption sintering or inhibition sintering.

Instead of introducing energy, the selective solidification of the applied building material can also be performed by means of 3D printing, for example by applying an adhesive. Generally, the invention relates to producing an object by means of applying and selectively solidifying, layer by layer, a building material in powder form regardless of the manner in which the building material is solidified.

Various kinds of powders may be used as building material, in particular metal powder, plastic powder, ceramic powder, sand, filled or mixed powders.

The invention claimed is:

1. A method for producing a three-dimensional object on a support by layer-wise applying and selectively solidifying a building material in powder form, the method comprising the steps of:

lowering the support to a predetermined height below a working plane;

applying an applied powder layer from a powder building material supply into the working plane over a build area in the working plane by an application device moving over the working plane;

selectively solidifying the applied powder layer at positions corresponding to a cross-section of the object to be produced;

repeating the steps of lowering, applying and selectively solidifying until the object is completed; and arranging a working table around the build area, the working table being at least partially located below the working plane, wherein the application device moves across both the build area and the working table for application of a layer, and wherein for at least one of the applied powder layers a quantity of build material in powder form applied in an area of the working table is reduced in an actively controlled way by a metering device associated with the application device and operating the metering device so that some or none of the building material in powder form is applied in the area of the working table to yield a total layer height of the applied powder layer that is smaller in the area of the working table than in the build area, and wherein actively controlling the quantity of the build material in powder form is performed in a way that, depending on the position on the working plane, less building material in powder form is applied than the quantity that would be possible due to a height difference between a lower extremity of the application device and a previously applied powder layer, the height of the applied powder layer determined by a predefined distance between the lower extremity of at least an elongated member of the application device extending across the build area and the previously applied powder layer.

2. The method according to claim 1, further comprising:
providing an intended application area comprising the build area and a boundary area surrounding the build area,
wherein the build area is a lowerable area within which the applied and selectively solidified powder layers are lowered before applying a new powder layer; and
application of the building material in powder form with respect to at least one applied powder layer takes place in an actively controlled way such that in the boundary area, at least in some regions less building material in powder form is applied than in the build area or no building material in powder form at all is applied.

3. The method according to claim 2, wherein application of the building material in powder form is controlled in such a way that the building material in powder form is applied over an entirety of the build area.

4. The method according to claim 1, wherein the actively controlled application of the building material in powder form takes place with respect to a plurality of the applied powder layers.

5. The method according to claim 1, further comprising metering the building material in powder form in the direction of the application device from a metering device moving along with the application device and then applying the building material in powder form by the application device.

6. The method according to claim 1, further comprising fluidizing and/or preheating the building material in powder form in the application device and/or the metering device before applying the building material to the working plane.

7. The method according to claim 1, further comprising controlling a metering of the building material in powder form via a closure in the application device and/or the metering device.

8. The method according to claim 7, further comprising variably opening and closing a slot in the metering device extending across the build area using a slider element mounted to extend a length of the slot and operated to variably open and close the slot.

9. The method according to claim 1, further comprising arranging a working plate around the build area in the working plane, the working plate being heated by a separate heating element, wherein a temperature of the working plate is controlled to be higher than a temperature within the build area.

10. The method according to claim 1, wherein a temperature of the working table is controlled to be higher than a temperature within the build area.

11. The method according to claim 1, further comprising arranging an overflow slit behind the build area in the application direction through which surplus powder can fall into an overflow container.

12. A method for producing a three-dimensional object on a support by layer-wise applying and selectively solidifying a building material in powder form, the method comprising:
lowering the support to a predetermined height below a working plane;
applying an applied powder layer of the building material in powder form in the working plane over a build area located within the working plane by an application device moving over the working plane, wherein the application device includes a first elongated member extending across the build area and in use is spaced a defined height above the working plane to thereby spread powder building material on the build area to or below the defined height in a layer;
selectively solidifying a respective applied powder layer at positions corresponding to a respective cross-section of the three-dimensional object to be produced;
repeating the steps of lowering, applying and selectively solidifying during a build process until the three-dimensional object is completed;
arranging a working table around the build area, the working table being at least partially located below the working plane; and
providing a supply of powder building material in a container associated with the application device, and a powder metering device at a bottom of the container, wherein the metering device includes an elongated slot defined in the container and extending across the build area and opening above the application device, and an element that variably opens and closes the slot to provide a variable gap through which the powder building material is delivered to the application device in a controlled manner,
wherein a quantity of applied building material in powder form is reduced or not deposited in at least a portion of one or more applied layers across an area of the working table in an actively controlled way to provide the portion with a reduced layer height, and
wherein a maximum height of the applied layer is determined by a distance between a lower extremity of the first elongated member and a previously applied powder layer, the reduced height determined by actively controlling the amount of building material with the metering device to deposit the build material in a height less than the defined height at desired places across the working table during the build process.

13. The method of claim 12, wherein the elongated slot is a single slot extending across the build area, and the element is a single element.

14. The method of claim 13 wherein the metering device is operated to produce one or more portions of reduced height along with applied areas of maximum height when applying the layer.

15. The method of claim 14, wherein multiple portions of reduced height are applied in a layer, and wherein the respective height of the portions of reduced height vary across the build area.

16. The method of claim 1, wherein the application device includes first and second elongated blades extending across the build area and spaced apart to define a space therebetween which yields a volume within which the building material is adapted to be received.

17. The method of claim 12, wherein the application device includes first and second elongated blades extending across the build area and spaced apart to define a space therebetween which yields a volume within which the building material is adapted to be received.

\* \* \* \* \*